United States Patent [19]

Bumgarner

[11] Patent Number: 4,477,997
[45] Date of Patent: Oct. 23, 1984

[54] ELEVATED WIRE SUPPORTED RODENT TRAP

[76] Inventor: Kie Bumgarner, 4230 Myrtle Ave., Long Beach, Calif. 90807

[21] Appl. No.: 466,920

[22] Filed: Feb. 16, 1983

[51] Int. Cl.³ .......................................... A01M 23/30
[52] U.S. Cl. ........................................ 43/58; 43/81
[58] Field of Search .............................. 43/58, 77, 81

[56] References Cited

U.S. PATENT DOCUMENTS 1,119,962 12/1914 Horr ...................................... 48/81
2,595,809 5/1952 Oxley ..................................... 43/81
3,058,256 10/1962 Wernham ............................. 43/81

Primary Examiner—Gene P. Crosby
Attorney, Agent, or Firm—William C. Babcock

[57] ABSTRACT

A rodent trap capable of being removably supported on an elevated wire to ensnare a rodent that nibbles bait on the trap or endeavors to walk over the trap. A pole removably secured to the trap serves to balance the trap on the elevated wire, and also permits the trap to be mounted on the wire and removed therefrom after a rodent such as a rat is caught.

1 Claim, 4 Drawing Figures

U.S. Patent     Oct. 23, 1984     4,477,997
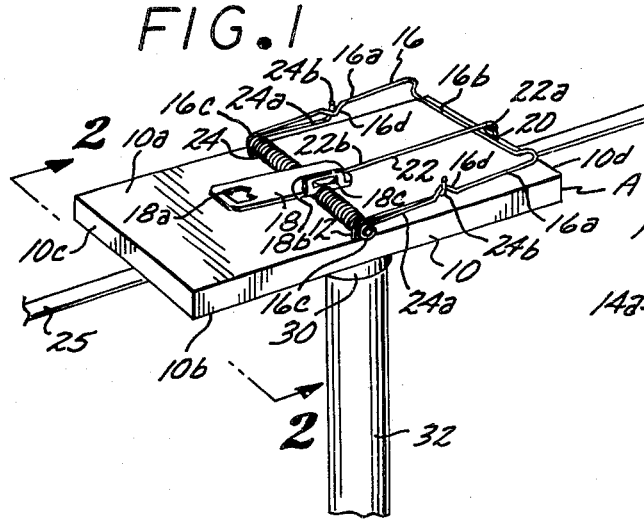
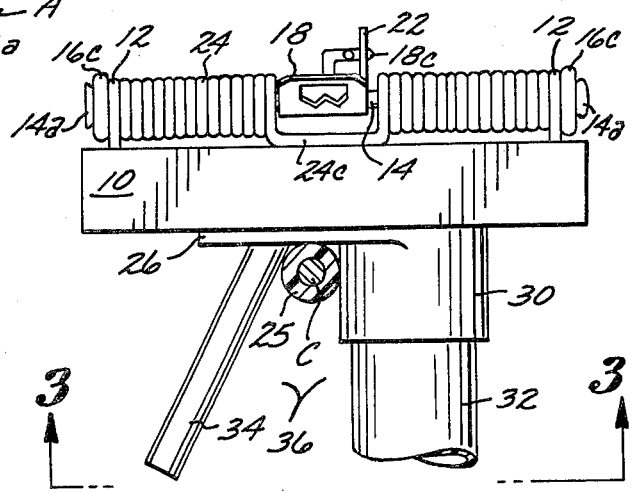
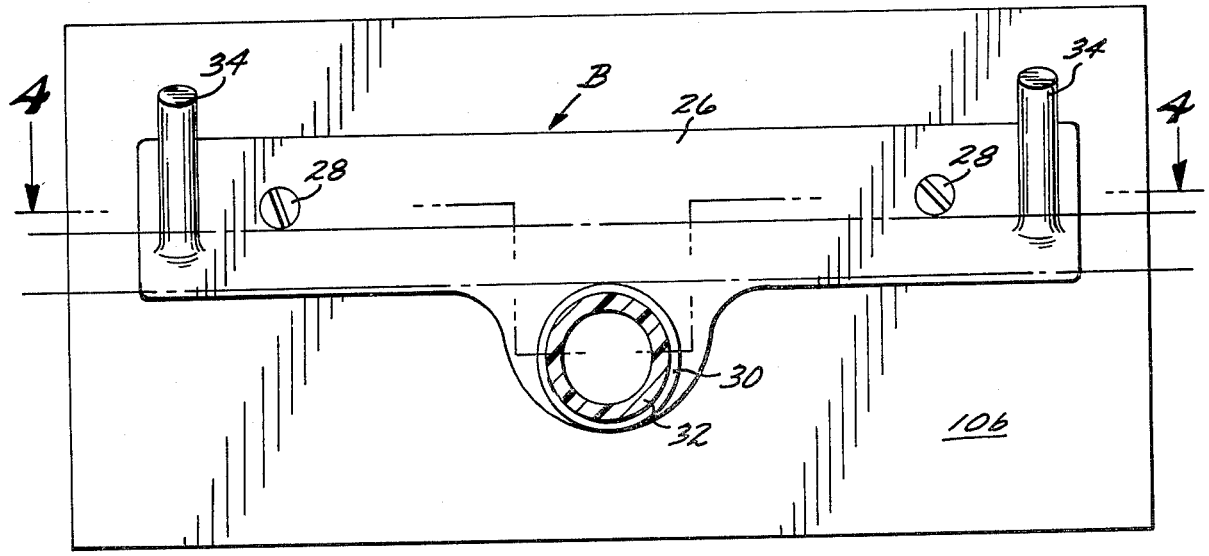
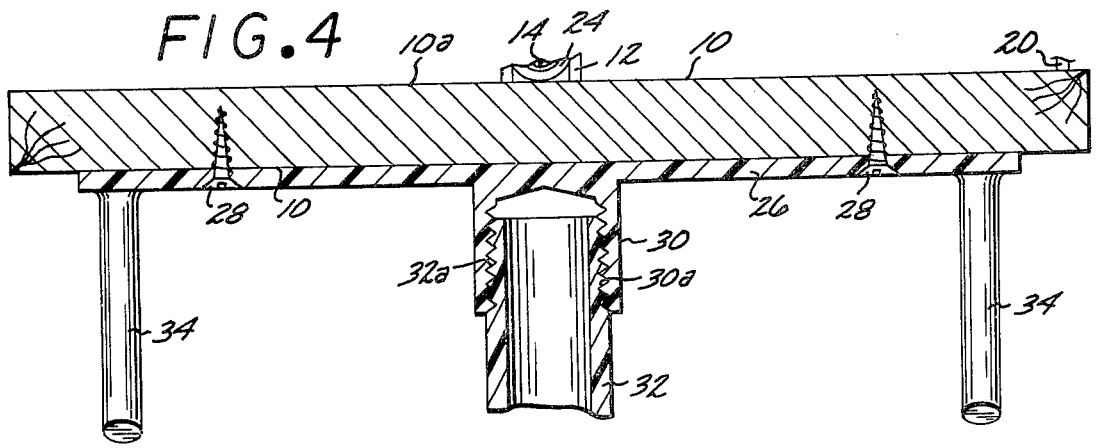

ELEVATED WIRE SUPPORTED RODENT TRAP

DESCRIPTION OF THE PRIOR ART

Rodent traps that include pivotally supported ensnaring members have been used for many years, particularly in the catching of rats. Rats as is well known can walk along wires and in so doing have access to the upper portions of buildings that would otherwise be inaccessible to them.

A major object of the present invention is to provide a trap that may be removably mounted on an elevated wire, and the trap being actuated to ensnare a rat, either by the rat nibbling on bait associated with the trigger mechanism of the trap, or the rat tripping the trigger mechanism by attempting to walk thereacross.

Another object of the invention is to provide a rat trap that has a pole associated therewith of such length as to raise the trap to a position where it removably engages an elevated wire, with the weight of the pole serving to balance the trap on the wire after the trap is in engagment therewith, and the pole also serving to retrieve the trap and bring it to the ground surface after a rat has been caught therein.

These and other objects of the invention will become apparent from the following description of a preferred form thereof.

SUMMARY OF THE INVENTION

A conventional rat trap that includes a rectangular base has an elongate strip of rigid material secured to the underside thereof, which strip has an internally threaded socket depending therefrom, as well as two angularly disposed legs that are longitudinally and laterally spaced from the socket to define a space of generally inverted V shaped transverse cross section therewith. A pole is removably secured to the socket, which pole has substantial weight, and is sufficiently long to permit the trap to be momentarily positioned above the elevated wire. By pulling downwardly on the pole, the space of inverted transverse cross section straddles the wire, and the trap is set in a fixed position thereon due to the legs and socket frictionally contacting the insulation coating on the wire. The weight of the pole tends to stabilize the position of the trap on the elevated wire, and prevents the trap pivoting transversely after it has been disposed at a set position on the wire. The pole also permits the trap to be disengaged from the elevated wire, and brought to the ground surface after a rodent such as a rat has been caught in the trap.

BRIEF DESCRIPTION OF THE DRAWINGS

FIG. 1 is a perspective view of the rodent trap removably mounted on an elevated wire;

FIG. 2 is an end elevational view of the trap taken on the line 2—2 of FIG. 1;

FIG. 3 is a bottom plan view of the trap taken on the line 3—3 of FIG. 2; and

FIG. 4 is a longitudinal cross sectional view of the trap taken on the line 4—4 of FIG. 3.

DESCRIPTION OF THE PREFERRED EMBODIMENT

The rodent trap A as best seen in FIG. 1 includes a rectangular base 10 formed from a rigid material such as wood. Base 10 includes a top surface 10a, bottom surface 10b, first end 10c and second end 10d. A pair of laterally spaced staples 12 engage base 10 substantially mid point ends 10c and 10d. A shaft 14 having enlarged end portions 14a extend between staples 14.

A generally U-shaped rodent ensnaring member 16 is provided as shown in FIG. 1 that includes a pair of side pieces 16a, end piece 16b, and loops 16c formed on the free end portions of the sidepieces. Loops 16c pivotally engage shaft 14 adjacent end portions 14a thereof as shown in FIG. 2. Side pieces 16a have concave-convex portions 16d formed therein. Member 16 is preferably formed of stiff wire.

An elongate trigger 18 is pivotally supported on the center portion of shaft 14 and extends towards first end 10c of base 10. The trigger 18 includes a recessed portion 18a in which bait (not shown) may be mounted. A side member 18b extends upwardly from trigger 18, with the member having an elongate opening 18c therein.

A staple 20 extends downwardly into the base 10 adjacent second end 10d thereof as shown in FIG. 1. An elongate retained wire 22 is provided that has a loop 22a in one end thereof that pivotally engages staple 20. The retainer wire 22 is formed with a convex-concave portion 22b adjacent the free end thereof.

A tensioned helical spring 24 encircles shaft 14, with the spring developing into a pair of arms 24a that have hook like end portions 24b that engage the concave-convex portions 16d as shown in FIG. 1. Spring 24 includes a center portion 24c that extends towards second end 10d of base 10, and is in abutting contact with top surface 10a. Portion 24c permits the spring 24 to be tensioned and not rotate on shaft 14 when the rodent ensnaring member 14 is in the cocked position shown in FIG. 1.

A mounting B is secured to the bottom surface 10b of base 10, and removably supports the trap A in a fixed position on elevated wire C which will normally have an insulation coating 25. The mounting B includes a strip 26 of rigid material that is secured in a longitudinal position on the bottom surface 10b of base 10 by screws 28 or other suitable fastening means. A socket 30 extends downwardly from strip 26, which socket has internal threads 30a. A pole 32 is provided that has threads 32a on one end portion thereof that may removably engage the threads 30a. A pair of longitudinally spaced legs 34 are situated on opposite sides of socket 30, are laterally spaced from the socket, and extend downwardly from strip 26 at an angle. The legs 34, socket 30, and strip 26 cooperate to define a generally inverted V-shaped space 36 that removably and frictionally grips the insulation 25 when the trap A is moved downwardly relative to the wire C to straddle the same.

The use and operation of the invention is simple. Trap A is set by pivoting the rodent ensnaring member 16 to the cocked position shown in FIG. 1, with the retainer portion 22b in engagement with opening 18c of trigger 18. Prior to the operation bait (not shown) is placed in recessed end 18a of trigger 18.

Pole 32 is now used to elevate trap A above wire C, with the pole thereafter being used to move the trap downwardly relative to the wire which is now situated in space 36. The mounting B now straddles the wire C, and the legs 34 and socket 30 frictionally engage insulation 25 and hold the trap in a fixed position thereon. The weight of the pole 32 prevents the trap A from pivoting transversely relative to the wire C.

The pole 32 permits the trap A to be moved upwardly and sidewise relative to wire C after a rat or rodent is caught, and the trap brought down to the ground surface.

From the above description it will be seen that a rat walking across the wire C may be caught either by nibbling on the bait (not shown) on trigger 18, or brushing against the trigger if it attempts to walk over the trap A.

The use and operation of the invention has been described previously in detail and need not be repeated.

What is claimed is:

1. The combination with a rodent trap of the type that includes a rectangular rigid base that has top and bottom surfaces, a spring loaded assembly mounted on said top surface for ensnaring a rodent, said assembly including a movable trigger on which bait may be placed to entice a rodent to move said trigger from a first to a second position, said trigger when moved to said second position either by a rodent nibbling on said bait or walking over said trigger actuating said assembly to ensnare the rodent causing said actuation, and a mounting for said rodent trap on an elevated wire on which a rodent may walk, said mounting including:

a. an elongate rigid strip permanently secured to said bottom surface;
   b. a socket that extends downwardly from said strip;
   c. a pair of longitudinally spaced legs that depend from said strip and are located on opposite sides of said socket and laterally spaced from the latter; and
   d. a pole of substantial weight and length removably mounted in said socket, said pole serving the dual function of allowing said trap to be elevated to above said wire and then lowered relative to said wire for a longitudinal portion of said strip to rest on said wire with said socket and legs disposed on opposite sides of said wire, with the weight of said pole preventing said trap pivoting transversely relative to said wire, and said pole permitting said trap to be disengaged from said wire and lowered to the ground after a rodent has been ensnared in said trap by moving said trigger to said second position.

* * * * *